June 12, 1951 J. FUMAT 2,556,751
LOOM CLUTCH AND STOP MECHANISM
Filed Feb. 9, 1949 5 Sheets-Sheet 1
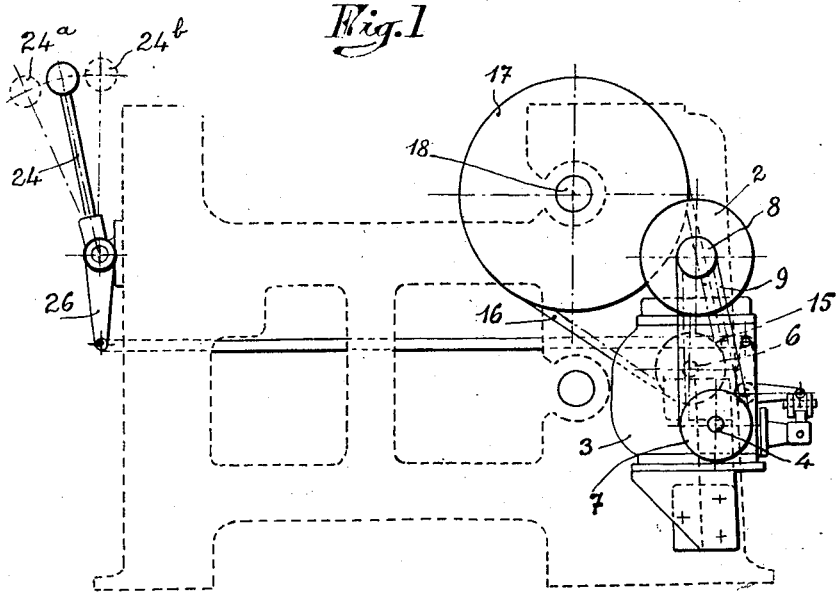
Fig. 1
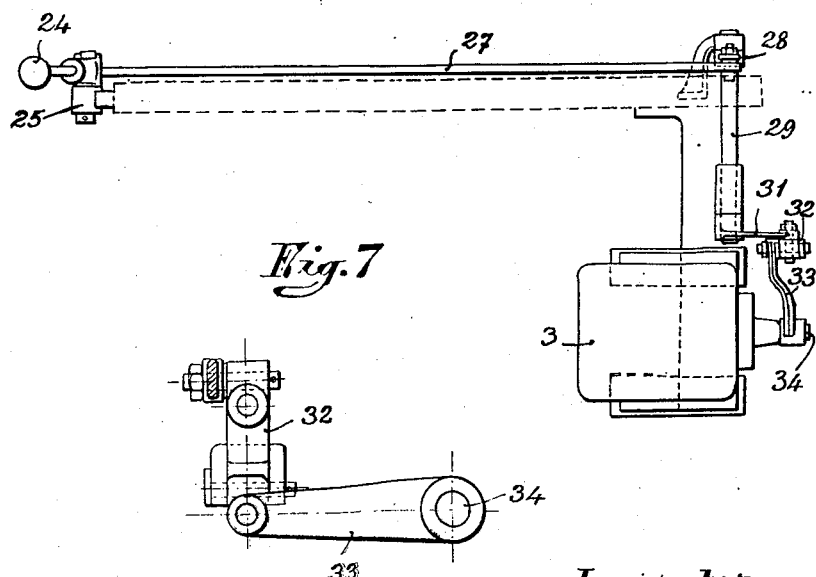
Fig. 2
Fig. 7
Inventor
Joseph Fumat
By: Hazeltine, Lake & Co.
Agents Inventor
JOSEPH FUMAT
By: Haseltine, Lake & Co.
AGENTS June 12, 1951 J. FUMAT 2,556,751
LOOM CLUTCH AND STOP MECHANISM
Filed Feb. 9, 1949 5 Sheets-Sheet 3

Inventor
JOSEPH FUMAT
By:
Haseltine, Lake & Co.
Agents

June 12, 1951           J. FUMAT           2,556,751
LOOM CLUTCH AND STOP MECHANISM
Filed Feb. 9, 1949           5 Sheets-Sheet 4
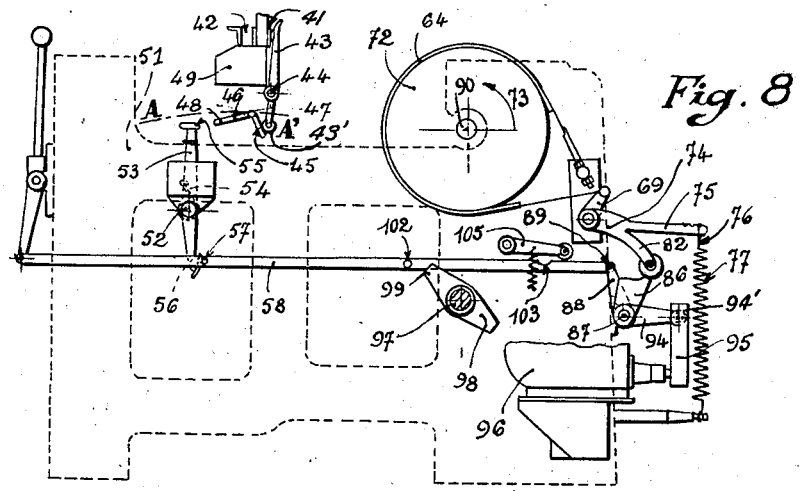
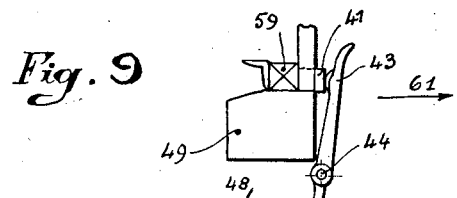
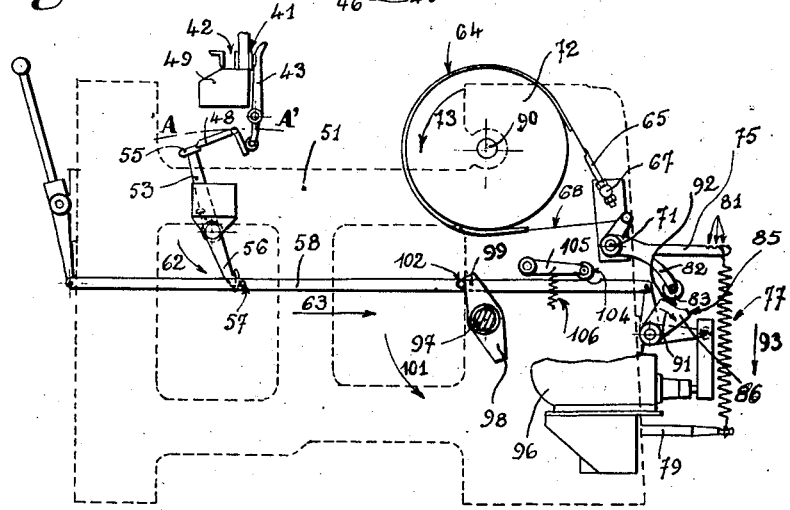
Inventor
JOSEPH FUMAT
By: Haseltine, Lake & Co.
AGENTS June 12, 1951  J. FUMAT  2,556,751
LOOM CLUTCH AND STOP MECHANISM
Filed Feb. 9, 1949   5 Sheets-Sheet 5

Inventor
JOSEPH FUMAT
By: Hauteine, Lake & C.
AGENTS

Patented June 12, 1951

2,556,751

UNITED STATES PATENT OFFICE 2,556,751

LOOM CLUTCH AND STOP MECHANISM

Joseph Fumat, Caluire, France, assignor to Etablissements Fumat, Caluire, France, a company of France Application February 9, 1949, Serial No. 75,318
In France February 11, 1948

7 Claims. (Cl. 139—1)

1

The control of weaving looms through individual motors has made it a general custom to provide a friction clutch on the crank shaft of each loom. A clutch of this type includes generally two plates or pulleys of cast iron of which one is keyed to the crankshaft and the other is loose and carries a large toothed wheel that receives directly its movement from a motor or engine running at about 950 R. P. M. and producing a considerable rotary torque and the cost price of which is comparatively high.

By reason of its diameter, such a clutch forms a heavy and bulky part that makes the operation of the loom more difficult and that is a cause of considerable inertia whenever the loom stops suddenly or very quickly under the action of a stop or through the operation of a weft fork. On the other hand the improvements provided for modern looms such as reverse motion for instance require the execution of a number of parts and clutches of a special design that make the loom more intricate.

The clutch for weaving looms according to the present invention shows all the advantages of similar arrangements that are already known while its manufacture is much simpler and its upkeep easier.

It involves the combination of a disc clutch operating in both directions and keyed to a shaft controlled by the motor so as to drive through a first pinion, which pinion is in engagement at the moment considered with the shaft, a second pinion meshing therewith and that is keyed according to the first pinion either directly to the output shaft adapted to drive the loom or else, for a reversing operation, to an intermediary shaft to which is keyed another pinion meshing with yet another pinion keyed to said output shaft on which is rigidly secured the pulley transmitting movement to the pulley keyed to the crankshaft.

This clutch allows therefore obtaining through a single control forward movement at normal speed, reverse movement at reduced speed and disconnection of the loom. Reversal of speed may be obtained instantaneously by reason of the considerable speed reduction of the clutch when operating under reverse speed conditions.

In association with this clutch, it is possible to use an arrangement for controlling automatically the braking of the loom, its setting into reverse and then its stopping with its shed open when said stopping is rendered necessary through an accident occurring during operation.

For this purpose, the member that is actuated when the shuttle is not in its correct position shifts the clutch control rod from normal position to reverse position and simultaneously actuates the brake of the loom, the boss on a cam carried by the batten shaft operating then by engaging a stop carried by said rod for urging it back from reverse position to neutral where it is held through dropping of a roller into a notch thereof, said roller being urged into said notch through an opposite thrust.

In the case of a mechanical control, the rod used for disengagement and reengagement into reverse is controlled by a lever that urges it back into reverse when an incorrect position of the shuttle allows a stop oscillating with the batten to come into contact with its nose.

In the case of an electromechanical control, the incorrect position of the shuttle in its box prvides for the closing of a swich inserted in the circuit of an electro-magnet which circuit is periodically closed by a current distributor controlled by the movement of the loom, the movable armature of the electromagnet being coupled with the leverage controlling the clutch in order to shift it from its position of forward operation into reverse.

There is illustrated in accompanying drawings by way of example an embodiment of the improved clutch together with two embodiments of the automatic control device adapted to be associated therewith.

In said drawings:

Fig. 1 is an elevational view showing the clutch positioned on the frame of the loom.

Fig. 2 is a plan view of the control means for said clutch after removal of the motor and its pulleys.

Figs. 6 and 7 show on a larger scale details of the linkage in the clutch control means.

Fig. 8 is an elevational view of the mechanical control system, the control rod being in clutch position for normal forward operation before the shuttle enters its box.

Fig. 9 is a diagrammatic view of the shuttle box containing a shuttle.

Figs. 10 and 11 are elevational views showing the control rod respectively in its reverse operation and declutching positions.

For controlling a loom through the improved clutch, there is provided an electric motor revolving at 1,500 R. P. M. The result of this arrangement is an economy both in the cost price and in the consumption of energy as compared to the motors generally used heretofore.

Figure 3:
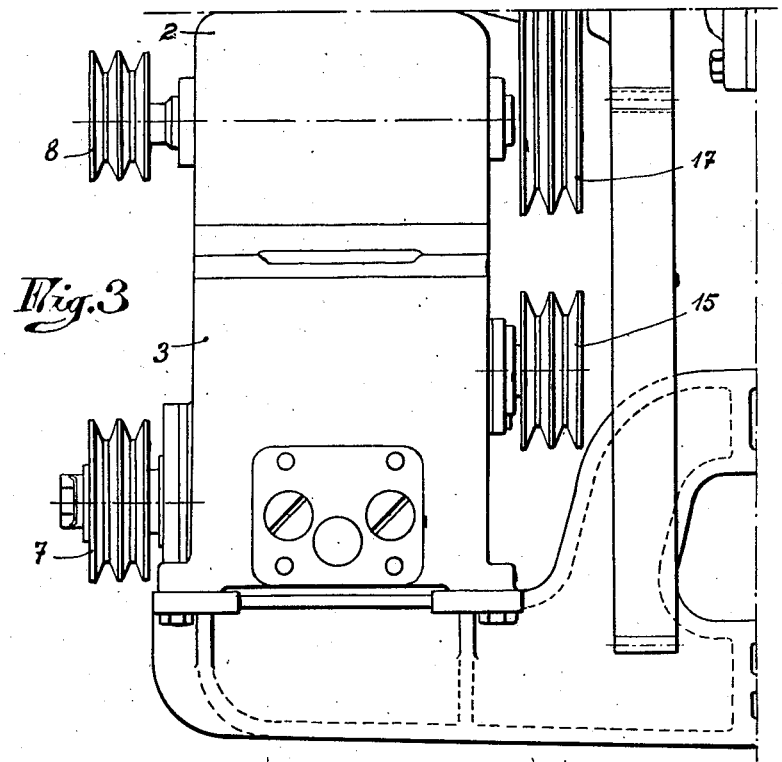
Figs. 3 and 4 are elevational views of the driving system and clutch seen respectively from the front and from the side.
Figure 5:
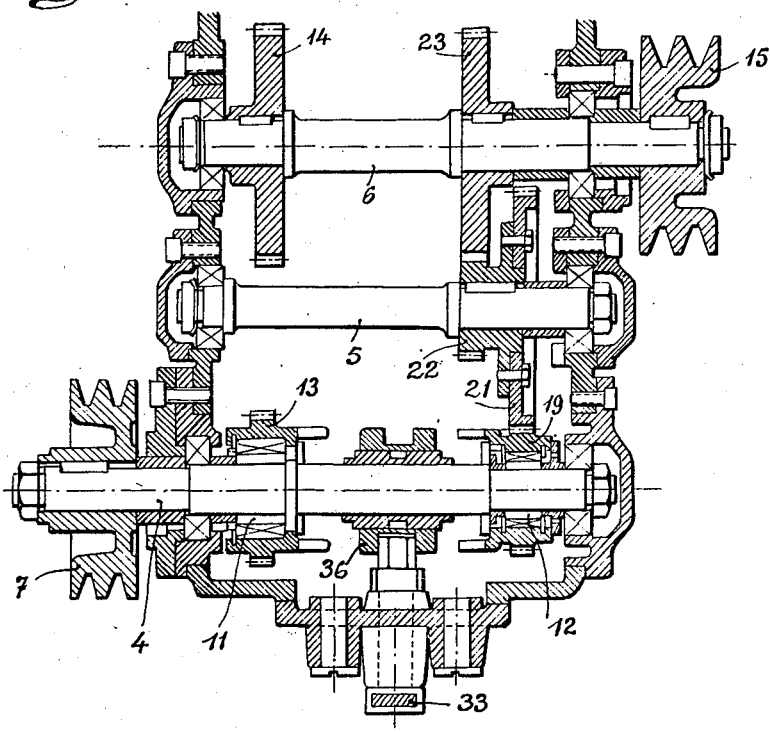
Fig. 5 is a developed view as seen cross-sectionally at line 5—5 of Fig. 4.

The electric motor 2 (Fig. 3) driving the loom through the agency of this clutch is secured above a fluidtight cast iron box 3 that is filled with oil, inside which rotate three shafts 4, 5, 6 (Fig. 5) carrying speed reducing pinions.

Figure 4:
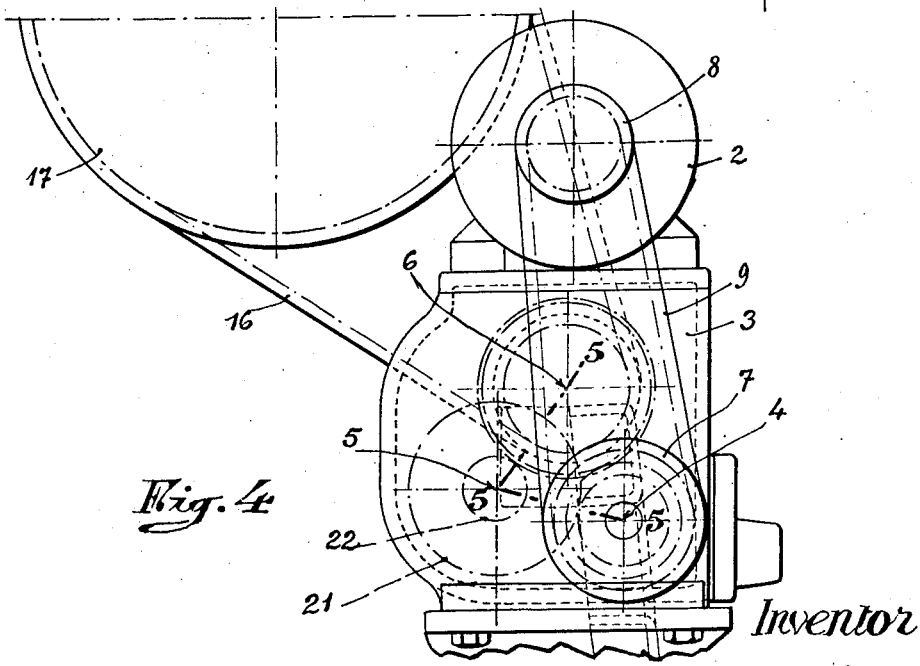

The main shaft 4 is provided outwardly of the box 3 with a grooved pulley 7 that is controlled through the pulley 8 (Fig. 4) of the motor 2 through the agency of the belt 9. To said shaft 4 are secured two clutches 11 and 12 (Fig. 5) provided with multiple discs of a system well known per se.

The first clutch 11 provided for forward operation acts directly through the clutch pinion 13 on the pinion 14 keyed to the output shaft 6 carrying also a grooved pulley 15 that drives through the agency of the belt 16 (Figs. 1, 3, and 4) the grooved flywheel or pulley 17 secured to the crankshaft 18 of the loom.

The second clutch (Fig. 5) controls the rearward movement of the loom at a reduced speed through control of the pinion 19 forming part of said clutch. Said pinion 19 that is driven by the discs of the disc clutch. Said pinion 19 that is driven by the discs of the disc clutch 12 is in permanent mesh with a pinion 21 rigid with the coaxial pinion 22 keyed to the intermediate reversing shaft 5, said pinion 22 meshing in its turn with the pinion 23 keyed to the output shaft 6. It is apparent that the interposition of the pinions 21, 22 on the intermediate shaft constrains the output shaft 6 to rotate in the same direction as the input shaft 4, whereas, in the preceding case, the two shafts 4, 6 rotate in opposite directions by reason of the direct interengagement between the pinions 13 and 14 (this latter interengagement does not appear in Fig. 5 which is a developed section of the clutch.

The control of each of the two clutch pinions providing respectively forward and reverse movement is operated through a single lever 24 (Fig. 1), the declutching or neutral position of which is provided between the two extreme positions of its stroke, 24a and 24b.

Figure 6:
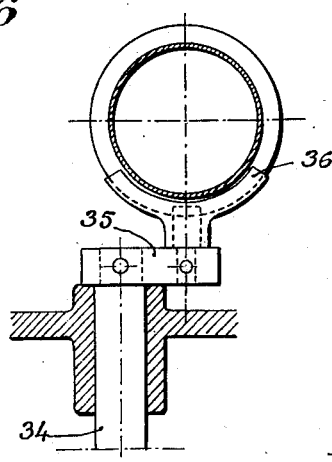

The shifting of the lever 24 rocking in either direction round the trunnion 25 (Figs. 2 and 7) actuates through its end 26 the control rod 27 that, through the transmission lever 28, the shaft 29, another transmission lever 31, the strap 32 and the lever 33 controlling the clutch, provides for the rocking of the shaft 34 acting directly on the engagement of either of the clutch pinions 13 or 19. As illustrated in Fig. 6, the shaft 34 is rigid with a crank lever 35 wherethrough said shaft controls directly the shifting of the clutch shoe 36 that may be caused to slide over the input shaft 4 (Fig. 5) as provided by the rocking of said shaft 34, said shifting of the shoe 36 constraining either of the clutches 11 or 12 to become operative and consequently the corresponding pinion 13 or 19 to rotate in unison with the input shaft 4.

The disc clutch that is thus applied to a novel control system is exceedingly powerful while of a very simple construction. The ease of its operation allows shifting the batten of the loom through a small fraction of a stroke so as to bring it into the desired position by bringing the clutch lever more or less towards its extreme position. The possibility of positioning said clutch on the lower rear part of the loom releases the crankshaft from the control means used heretofore. This leads in the finished loom to a less obstructed appearance and a greater simplicity in manufacture.

A suitable drive and regular operation are ensured by the high speed reduction, say as between 1 and 8, between the speed of the motor and the speed of the loom in the case of a loom rotating e. g. at 180 R. P. M.

The principal advantages of said clutch are a large speed reduction in the control, execution of speed reversal independently of the loom and the cutting out in the loom of all members liable to produce inertia effects that might be detrimental to its operation and quick stopping.

When, for any reason whatever the position of the shuttle at its point of destination is not the correct position, a system providing for immediate stoppage of the batten, through braking and reversal of operation under simultaneous control, allows cutting out the usual stops. A boss on the shuttle box actuates the improved arrangement.

In a first embodiment providing for mechanical control, the boss 41 (Fig. 8) of the shuttle box 42 controls for instance through the roller 43' carried by the further end of the lever 43 that is pivotally secured at 44, the arm 45 of the bell crank 46 that is pivotally secured at 47 while the end 48 of the other arm forms a movable stop located underneath the batten 49, said stop 48 describing the arc AA' in unison with the arc A—A'.

To the frame 51 is pivotally secured at 52 the lever 53 that when inoperative is urged back by a spring 54 in order to occupy the substantially vertical position illustrated in Fig. 8. At its upper end said lever 53 is provided with a nose piece 55. At its lower end its tip 56 is in contact with or very near the stop 57 secured to the rod 58 controlling the clutch (that corresponds to rod 27 of Fig. 2).

After the shuttle 59 has travelled entirely through its prescribed path, it occupies (Fig. 9) its normal position in the box 42 and the boss 41 is urged in the direction of the arrow 61 (Fig. 9) consequently the movable stop 48 that rocks with the batten 49 is raised and passes freely above the nose-piece 55. In contradistinction, if the shuttle 59 is not properly positioned against the boss 41 in the box 42, the stop 48 that is not raised by the lever 43 remains in its lower position for which its path meets the nose piece 55 on the lever 53. This produces a shock under the action of which the lever 53 pivots in the direction of the arrow 62 (Fig. 10) in a manner such that its lower end 56 urges the stop 57 and therewith the control rod 58 in the direction of the arrow 63. When thus operated, the rod 58 controls simultaneously the release of the brake and speed reversal, said operations being followed by a stopping of the loom.

The braking is obtained through the brake 64 constituted as well known per se by a self-fastening steel band one end 65 of which is rigidly secured at 67 while the other movable end 68 is attached to a lever 69 pivotally secured at 71 in the case where the drum 72 on which the band acts rotates in the direction of the arrow 73 (Fig. 8). The lever 69 controlling the brake is rigid with another lever 74 secured to the same pivot and including two arms. To the end of one arm 75 of the last mentioned lever is secured the end 76 of a spring 77 the other end 75 of which is secured to any desired stationary member 79. In order to adjust the tractional effort of the spring 77, its end 76 may be shifted into a predetermined notch of the rack 81 on the lever arm 75. To the end 82 of the other lever arm 74 is secured a roller 83 revolving round its axis and adapted to come into contact with the boss 85 of a cam 86 secured to the shaft 87 the rotation of which is controlled by the crank 88 pivotally secured at 89 to the rod 58.

When its boss 85 (Fig. 8) engages the roller 83, the cam 86 cancels the tractional effort of the spring 77 and causes the lever 74 to rise. The loom is thus released from the action of the brake and may operate normally.

In contradistinction, if the cam 86 has pivoted in the direction 91 (Fig. 10), the roller 83 releases the boss 85 and drops into the recess 82 of the cam so that the spring 77 draws the arm 75 of the lever 74 in the direction of the arrow 93 and produces a very energetic braking of the normally operating loom.

It should be remarked that a band brake of this type does not act in practice on the loom during reverse operation. The braking of the rotation during said reverse operation does not occur in fact with a self-fastening brake; at the moment of said reverse operation, the power of the motor releases the brake.

To the shaft 87 carrying the cam 86 is also secured a crank 94 pivotally secured at 94' to the crank 95 controlling the clutching and declutching for both directions of operation through the agency of the clutch members located inside the casing 96.

The rapid shifting at the end of its stroke of the rod 58 in the direction of the arrow 63 (Fig. 10) produces at the same time as the braking that has just been described a reversal of operation through a rocking at the end of stroke of the crank 95 that returns now in the direction of the arrow 93 (Fig. 10).

The crank-shaft 90 of the loom is then caused to rotate rearwardly in a direction opposed to that of the arrow 73 (Fig. 10) until the moment at which the batten is in its extreme position corresponding substantially to horizontality.

Figure 11:
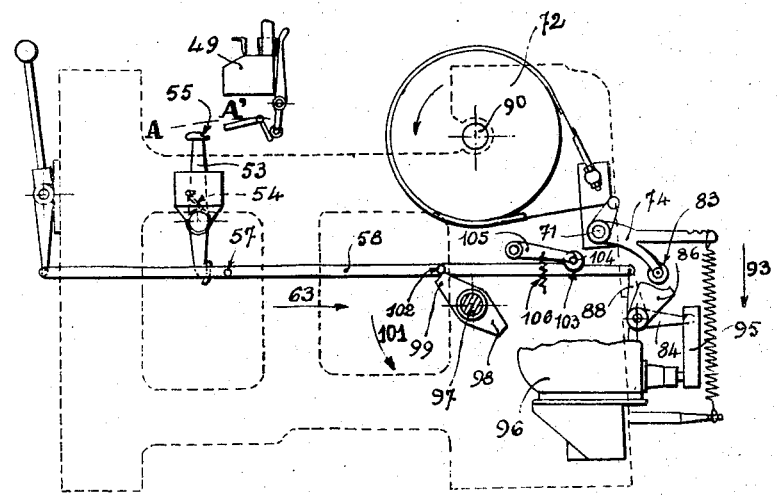

When the batten has reached this position, the loom stops as the operating rod 58 has returned to its mean position that is the position corresponding to declutching (Fig. 11) after moving against the direction of the arrow 63 under control of the control cam 98 carrying two bosses of suitable shape and keyed to the batten shaft 97. The boss 99 of said cam 98 rotating in the direction of the arrow 101 urges the stop 102 and therewith the rod 58 into their mean position.

The action of the boss 99 of the cam 98 on said stop 102 prevents the loom from being set again into reverse. On the other hand nothing prevents restarting the loom forwardly, the stop 102 occupying then the position illustrated in Fig. 8 for which the bosses of the cam 98 are allowed to move freely.

In order that the rod 58 may always stop automatically in the exact position corresponding to disengagement of the clutch producing the complete stopping of the loom and so that it may remain in said position, said rod 58 is provided at a point of its length with a notch 103 engaged by a roller 104 secured to the end of a lever 105 urged against the rod by a spring 106.

The instantaneous reversal of operation of the loom is rendered possible through the high speed reduction of the clutch operating for reverse. On the other hand speed reversal is not disturbed by the self-fastening brake that is operative only for forward operation corresponding to the direction indicated by the arrow 73 of Fig. 8.

The arrangement of stops is about the same as in most known looms and includes always a lug meeting a stop when the disconnecting arrangement is to be actuated. Now, if the action of such stops is not perfectly reliable, it is dangerous for the frame of the loom that is constrained to absorb at a single point a comparatively important shock that sometimes may damage it seriously. Furthermore the mass constituted by the rod of the stop leads to the necessity of increasing the driving strain of the loom while the adjustment is rendered difficult. Such drawbacks are removed by the present invention that provides a novel arrangement instead of the prior stop system.

Figure 12:
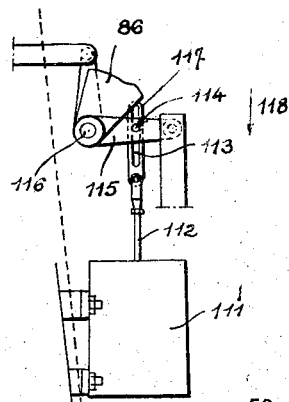
Fig. 12 is a diagrammatic view of an electromechanical control forming part of the loom.

In a further embodiment of the invention, the control rod 58 may be actuated electrically instead of mechanically. In this case the purely mechanical action is done away with and is replaced by the closing of an electric circuit including an electromagnet 111 (Fig. 12) attracting a core provided with a rod 112 with a slideway 113. A pivot 114 engaging the slideway 113 is mounted on the crank 115 keyed to the shaft 116 carrying the braking cam 86 described in respect to the prior embodiment. When the core is attracted downwardly by the electromagnet 111, the thrust of the end 117 of the slideway 113 on said pivot 114 produces a rotation of the crank 115 in the direction of the arrow 118 at the same time as that of said cam 86.

The resulting movement is the same as that produced mechanically and thereby the same braking, speed reversal and stopping effects are obtained.

Figure 13:
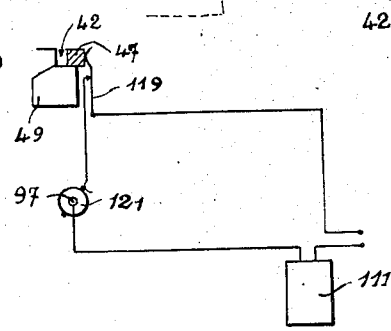
Fig. 13 is a diagram of the electric connections to be executed for this second embodiment.
Figure 14:
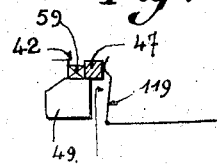
Fig. 14 is a partial view illustrating the switch in Figs. 12 and 13, that opens when the shuttle is properly positioned inside its box.

The diagram of the connections that may be provided is illustrated in Fig. 13 and includes in particular a switch 119 controlled by the rotation of the boss 41. Said switch being normally closed, the circuit of the electro-magnet passing through said switch should be controlled by an arrangement closing it periodically at the moment at which the shuttle is to enter the boss 42. To this purpose, a rotary distributor 121 is keyed to the crank shaft 90. The substitution of this electric switch for the mechanical control projections of the prior embodiment provides an easier adjustment of the movement of the batten, as the bosses act now merely for braking the shuttle in the normal manner.

In neither control, whether mechanical or electrical, is there a substantial supplementary effort required for braking the arrival of the shuttle.

The same clutching and braking system may also be caused to operate in the same manner through any safety member such as weft fork, warp protector etc.

Obviously, my invention is not limited to the two embodiments that have been more particularly described and it covers all the modifications in position of the mechanical or electric members, their size, shape and relative position, chiefly as concerns the application to the operation of textile machines other than looms, within the scope defined in accompanying claims.

What I claim is:

1. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, means controlling said rod, a pinion rigid with each clutch component, a pinion rigid with the output shaft in permanent engagement with one of said clutch pinions, a pinion rigid with the intermediate shaft in permanent engagement with the second clutch pinion and a gearing constraining the intermediate shaft and output shaft to permanently rotate in opposed directions, the speed reduction between last mentioned clutch component and the output shaft through the intermediate shaft being a high one, and a brake for the loom mechanism controlled by the said rod controlling the selective means.

2. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, a pinion rigid with each clutch component, a pinion rigid with the output shaft in permanent engagement with one of said clutch pinions, a pinion rigid with intermediate shaft in permanent engagement with the second clutch pinion and a gearing constraining the intermediate shaft and output shaft to permanently rotate in opposed directions, the speed reduction between last mentioned clutch component and the output shaft through the intermediate shaft being a high one, a shuttle box, a batten carrying same, a shuttle adapted to reciprocate into and out of the shuttle box, means whereby an incorrect positioning of the shuttle in the shuttle box controls the rod controlling the selective means and a brake for the loom mechanism controlled by the said rod controlling the selective means.

3. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, a pinion rigid with each clutch component, a pinion rigid with the output shaft in permanent engagement with one of said clutch pinions, a pinion rigid with the intermediate shaft in permanent engagement with the second clutch pinion and a gearing constraining the intermediate shaft and output shaft to permanently rotate in opposed directions, the speed reduction between last mentioned clutch component and the output shaft through the intermediate shaft being a high one, a shuttle box, a batten carrying same, a shuttle adapted to reciprocate into and out of the shuttle box, a boss on the shuttle box controlled by the proper engagement of the shuttle in said shuttle box, an electromagnet controlling the control rod, an electric circuit for said electromagnet and means for energizing the electromagnet circuit at the end of the shuttle stroke when the boss on the shuttle box has not been urged aside by the incoming shuttle.

4. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, a pinion rigid with each clutch component, a pinion rigid with the output shaft in permanent engagement with one of said clutch pinions, a pinion rigid with the intermediate shaft in permanent engagement with the second clutch pinion and a gearing constraining the intermediate shaft and output shaft to permanently rotate in opposed directions, a shuttle box, a shuttle adapted to reciprocate into and out of the shuttle box a batten carrying the shuttlebox adapted to control said shuttle and including a spindle, means whereby an incorrect positioning of the shuttle in the shuttle box controls the rod controlling the selective means and a brake for the loom mechanism controlled by the said rod controlling the selective means and means controlled by the loom mechanism when the batten spindle has been returned into a predetermined position for returning the control rod into its intermediate neutral position for which neither clutch component is engaged.

5. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, a pinion rigid with each clutch component, a pinion rigid with the output shaft in permanent engagement with one of said clutch pinions, a pinion rigid with the intermediate shaft in permanent engagement with the second clutch pinion and a gearing constraining the intermediate shaft and output shaft to permanently rotate in opposed directions, a shuttle box, a shuttle adapted to reciprocate into and out of the shuttle box, a batten adapted to control the movement of said shuttle and including a spindle, means whereby an incorrect positioning of the shuttle in the shuttle box controls the rod controlling the selective means and a brake for the loom mechanism controlled by the said rod controlling the selective means and means controlled by the loom mechanism when the batten spindle has been returned into a predetermined position for returning the control rod into its intermediate neutral position for which neither clutch component is engaged and a roller adapted to snap into engagement with the control rod when the latter is in its neutral position for holding it therein.

6. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, a pinion rigid with each clutch component, a pinion rigid with the output shaft in permanent engagement with one of said clutch pinions, a pinion rigid with the intermediate shaft in permanent engagement with the second clutch pinion and a gearing constraining the intermediate shaft and output shaft to permanently rotate in opposed directions, the speed reduction between last mentioned clutch component and the output shaft through the intermediate shaft being a high one, a shuttle box, a shuttle adapted to reciprocate into and out of the shuttle box, means whereby an incorrect positioning of the shuttle in the shuttle box controls the rod controlling the selective means and a brake for the loom mechanism controlled by the said rod controlling the selective means and a hand-operated lever pivotally secured to the clutch and brake controlling rod for returning same into its extreme position corresponding to forward movement.

7. In a loom incorporating a power unit, the combination of a driving unit, a loom mechanism, a crankshaft controlling said loom mechanism, an intermediate shaft, a shaft controlled by the power unit, an output shaft adapted to drive the crankshaft, a double clutch including two components rotatably carried by the power unit controlled shaft, means adapted to engage selectively each component with the power unit controlled shaft, a rod controlling last-mentioned selective means, a pinion rigid with each clutch component, a pinion rigid with the output shaft in permanent engagement with one of said clutch pinions, a pinion rigid with the intermediate shaft in permanent engagement with the second clutch pinion and a gearing constraining the intermediate shaft and output shaft to permanently rotate in opposed directions, a shuttle box, a shuttle adapted to reciprocate into and out of the shuttle box, a batten adapted to control the said reciprocation of the shuttle and including a spindle means whereby an incorrect positioning of the shuttle in the shuttle box controls the rod controlling the selective means and a brake for the loom mechanism controlled by the said rod controlling the selective means and means controlled by the loom mechanism when the batten spindle has been returned into a predetermined position for returning the control rod into its intermediate neutral position for which neither clutch component is engaged and a roller adapted to snap into engagement with the control rod when the latter is in its neutral position for holding it therein, and a hand-operated lever pivotally secured to the clutch and brake controlling rod for returning same into its extreme position corresponding to forward movement.

JOSEPH FUMAT.

REFERENCES CITED

The following references are of record in the file of this patent:

UNITED STATES PATENTS

| Number | Name | Date |
| --- | --- | --- |
| 86,805 | Bigelow | Feb. 9, 1869 |
| 560,036 | Hutchins | May 12, 1896 |
| 834,394 | Metcalf | Oct. 30, 1906 |
| 1,760,970 | Wakefield | June 3, 1930 |
| 1,812,206 | Hindle et al. | June 30, 1931 |